Figure 1:
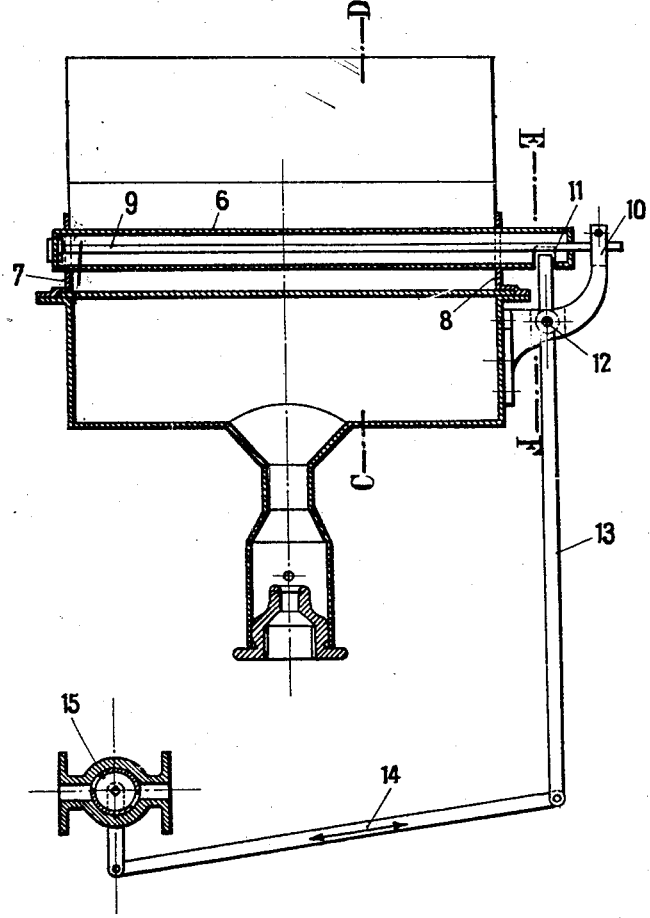

July 3, 1928. 1,675,966
F. WOLFF
REGULATING DEVICE FOR GAS AND AIR MIXING PLANTS,
GAS DELIVERY PLANTS, AND THE LIKE
Filed May 21, 1925    2 Sheets-Sheet 1

(A-B)

(C-D)

(E-F)

Inventor:
Friedrich Wolff
By B. Singer, Atty.

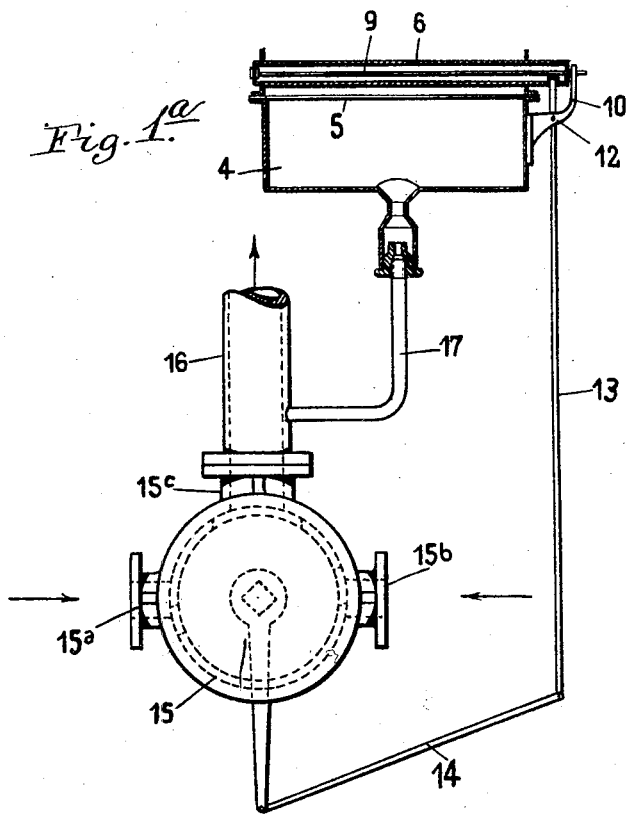

Patented July 3, 1928.

UNITED STATES PATENT OFFICE.

1,675,966

FRIEDRICH WOLFF, OF BERLIN, GERMANY.

REGULATING DEVICE FOR GAS AND AIR MIXING PLANTS, GAS-DELIVERY PLANTS, AND THE LIKE.

Application filed May 21, 1925, Serial No. 31,979, and in Germany June 3, 1924.

This invention relates to a regulating device for gas and air mixing plants, gas delivery plants or the like.

Regulating devices for gas and air mixing plants are already known in which a thermo-couple is employed disposed in the core of the flame of an auxiliary or control burner, for which purpose the form of a Bunsen burner is suitable.

In these regulating devices alterations in the comparatively low temperature of the flame consequent on alterations in the composition of the mixture are followed by an alteration in the electro-motive force of the thermo-couple whereby a relay is thrown into the circuit which actuates a throttle valve for the gas and air inlets.

The electro-motive force of the thermo-couple is, however, very slight, so that the comparatively slight fluctuations of the electro-motive force, corresponding to the varying temperature of the core of the flame, necessitates very sensitive relays in order to effect a reliable connection of the throttle regulator.

The subject matter of the present invention is a new regulating device for such gas and air mixing plants in which likewise a test burner, formed as a Bunsen burner, is used and is fed by the gas mixing plant.

The essential features of the invention consists in that instead of the thermo-couple an expansible body of suitable length is arranged in the core of the flame of the auxiliary or control flame, which body actuates the rod of the throttle valve accordingly as the changing temperature varies its expansion. Consequently the provision of a special relay is unnecessary, and the capacity for expansion and contraction of a body of this kind is considerable. Further greater reliability of the regulation is ensured and finally the device for effecting the regulation is of particularly simple construction.

Figure 2:
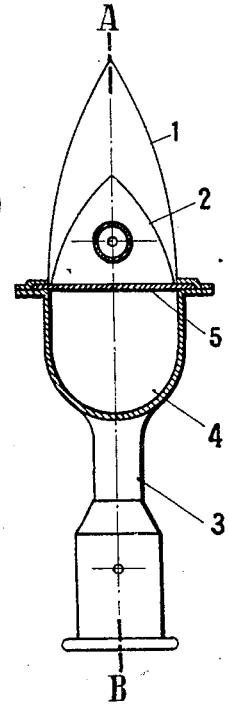
Figure 3:
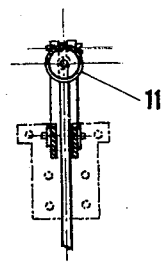

An example of the subject matter of the invention is illustrated in the drawing, in which:

Figs. 1 and 1ª are respectively a vertical section through the test burner and the regulating arrangement, Fig. 2 is a section on line C D of Fig. 1, and Fig. 3 is a section on line E F of Fig. 1.

In the drawing 1 represents the test flame and 2 the core of the flame. The flame is produced by a Bunsen burner 3 of which the mixing chamber 4, which is closed by the perforated plate 5, is elongated as shown. Above the plate 5, approximately in the center of the core 2 of the flame 1, the expansion body 6 is arranged in such a way that it passes through the entire width of the core of the flame. It consists, according to the example shown in the drawing, of a brass pipe which is slidably carried between the sides 7 and 8 of the body of the burner, its rear end being attached to a rod 9 which passes through the brass tube and has a very low co-efficient of expansion, the front end of this rod 9 is held by an exteriorly disposed rigid supporting clip 10. The rear end of the expansion body 6 is likewise fixed.

In the example illustrated the expansion body 6 is provided at the front end 11 with an opening with which engages the upper end of the lever 13 mounted on a spindle 12. The lower end of this lever is connected to the rod 14 which actuates the gas or air or the gas and air valve. The length of the expansion body 6, and proportionately the transverse length of the flame, is selected with a view to attaining relatively large expansions within the limits of the variations of temperature in the core of the flame, so that the expansion body actuates the regulating rod, 13, 14.

The device can also be used in such a way that the expansion body, on the occurrence of a certain alteration of the Bunsen flame and a contingent expansion of the part of the expansion body which has a higher co-efficient of expansion as to release a quick acting valve or electric switch so that the gas delivery or the air delivery, or the gas and air mixture delivery are completely interrupted and the whole plant is put out of action.

Fig. 1ª shows the communication between the regulating valve 15 (Figure 1) for the inlet of gas and air and the outlet of the mixture with the regulating member in the pilot burner 1. This figure also shows the branch conduit which conveys a portion of the mixture to the regulating burner. In this figure 15 indicates the regulating member, 15ª the air inlet, 15ᵇ the gas inlet, 15ᶜ the outlet for the mixture, 16 the communicating conduit for the mixture, and 17 the branch conduit leading to the test burner 4.

The use of the regulating device is not confined to gas and air mixing plants, but it may also be used in gas delivery plants where there is a danger that air can get into the gas.

Claims:

1. A regulating device for use in connection with gas and air mixing plants and gas delivery plants, comprising a test burner arranged to produce a broad flame, means for feeding a portion of the fuel mixture to said test burner, an expansible body comprising a tube fast at one end and passing through the core of the flame, a rod within said tube, said rod being fixed at both ends and said tube being free to expand along said rod, a gas supply, a valve controlling the gas supply, a lever actuating said valve, and a connection between said lever and the said expansible tube.

2. A regulating device for use in connection with gas and air mixing plants and gas delivery plants, comprising a test burner arranged to produce a broad flame, means for feeding a portion of the fuel mixture to said test burner, an expansible body comprising a tube passing through the core of the flame of the burner, supports in which the tube is slidably mounted, said supports being arranged upon the case of the burner, and said tube being fast at one end, a rod within the tube, and fixed at both ends, said tube being free to expand along said rod, a gas supply, a rigid connection for the other end of said rod disposed externally of the burner, a valve controlling the gas supply, a lever actuating said valve and a connection between the tube and one end of said lever.

3. A regulating device for use in connection with gas and air mixing plants and gas delivery plants, comprising a test burner arranged to produce a broad flame, means for feeding a portion of the fuel mixture to said test burner, an expansible body comprising a tube passing through the core of the flame of the burner, supports in which the tube is mounted, said supports being formed upon the case of the burner, a rod within and secured at one end to said tube, a rigid connection for the other end of said rod disposed externally of the burner, said tube being free to expand along said rod, a gas supply, a valve controlling the gas supply, a lever actuating said valve, a bearing formed upon the free end of the expansible body, said bearing being engaged by one end of said lever, a connection between the other end of said lever and the valve, and a rod passing through the mixture pipe.

In testimony whereof I have hereunto set my hand.

FRIEDRICH WOLFF.